Nov. 7, 1961 C. E. REITH 3,008,001

TELEVISION SYSTEMS

Filed June 13, 1956 3 Sheets-Sheet 1

INVENTOR.
CHARLES E. REITH
BY
Wallace and Cannon
ATTORNEYS

TELEVISION SYSTEMS

Filed June 13, 1956 3 Sheets-Sheet 2

INVENTOR.
CHARLES E. REITH
BY *Wallace and Cannon*
ATTORNEYS

INVENTOR
CHARLES E. REITH
BY *Wallace and Cannon*
ATTORNEYS

United States Patent Office 3,008,001

Patented Nov. 7, 1961

3,008,001

TELEVISION SYSTEMS

Charles E. Reith, Fort Wayne, Ind., assignor to Fisher Engineering, Inc., Huntington, Ind., a corporation of Indiana Filed June 13, 1956, Ser. No. 591,199
12 Claims. (Cl. 178—6.8)

This invention relates to a television system; more particularly, the invention is concerned with a method and apparatus for television transmission which substantially reduces the cost and structural complexity of the transmitter equipment, and is intended to operate using one or more conventional television receivers as receiving terminal units.

There are a number of applications in which television could be advantageously employed except for the fact that the equipment required, particularly the transmitting equipment, is much too expensive to be economically feasible. One of the most common examples of the need for economical transmitting equipment is encountered in the field of television receiver repair. Whenever a repair technician replaces the picture tube in a broadcast television receiver or makes other repairs or changes which affect operation of the picture tube, it is necessary to re-align the receiver to obtain an accurate and satisfactory picture raster. In order to align the set, it is necessary to adjust the horizontal and vertical linearity controls, the horizontal and vertical drive controls, and numerous other devices in the receiver. For this purpose, if accurate alignment is to be obtained, it is almost essential that the technician have available a test pattern signal generator to provide a constant picture which enables him to judge vertical and horizontal linearity, raster size, "gray-scale" reproduction, and numerous other factors. A test pattern signal generator of this type, however, is relatively expensive and consequently is beyond the means of many television repairmen.

Another field in which relatively inexpensive television transmitter equipment can fulfill a definite need is that of education. For example, many primary and secondary schools are now being equipped with television receivers to permit them to participate in educational programs utilizing this medium. The utility and desirability of these installations could be greatly enhanced if it were possible for the school to utilize the same television equipment to permit a single lecturer to be heard and to present graphic educational material simultaneously in the various rooms of the school. Other fields in which economical transmitter equipment can fulfill a definite need are in advertising, in presentation of specialized programs requiring the viewing of graphic material, as at technical and professional meetings, and other similar fields.

In most of these fields, television is not utilized for the simple reason that the equipment required costs too much. Moreover, the possibilities of reducing transmitter costs utilizing conventional techniques and ideas are not particularly promising, since the transmitting equipment for a conventional television system, whether for closed-circuit or broadcast use, must include some sort of scanning or pick-up device together with a complete synchronizing-signal generator and other associated equipment. Moreover, most conventional closed-circuit systems require specialized receivers for use in conjunction with the transmitting equipment.

It is an object of the invention, therefore, to effect a substantial reduction in the cost of transmitting equipment for a television system by utilizing an extremely inexpensive pick-up transducer including, in part, a conventional television receiver.

Another object of the invention is to provide a method and apparatus for closed circuit television in which synchronizing signals may be derived from a local telecast in order to avoid the necessity of providing a synchronizing signal generator.

A further object of the invention is to utilize conventional broadcast receivers as both scanning and monitoring terminal equipment in a television system and to permit use of a given receiver for both normal broadcast reception and closed circuit reception.

An additional object of the invention is to reduce substantially the cost of equipment capable of relaying or rebroadcasting a television program by utilizing a conventional television receiver as a scanner.

Another object of the invention is to provide a television transmitter for closed circuit or broadcast transmission which utilizes a conventional television receiver as a scanner and which includes means for controlling that scanner in accordance with either a received telecast or a locally generated synchronizing signal.

Another object of the invention is to provide a self-contained television transmitter unit which is greatly simplified as compared with conventional transmitter gear and consequently is much less expensive than previously known equipment.

Another object of the invention is to afford a highly economical and greatly simplified self-contained transmitter unit, capable of generating a signal which may be reproduced by a standard broadcast television receiver, in which the image may be varied to correspond to images carried by any one of a number of transparencies or other image-bearing devices.

A corollary object of the invention is to provide a method and apparatus for television transmission which utilizes conventional television receivers at both terminals of the system but which is not dependent upon use of any particular type of receiver.

In its apparatus aspect, the invention is directed to a television transmission system for generating a carrier-modulated television signal suitable for controlling a conventional broadcast receiver; in the preferred embodiment described herein, the transmitter unit includes an ordinary television receiver utilized as a scanner. In other embodiments, however, other suitable scanning apparatus may be substituted for the scanner receiver. The transmitter unit of the invention includes a synchronizing signal generator for developing a synchronizing signal including both horizontal and vertical frequency components; the transmitter unit further includes means for developing a carrier-modulated synchronizing signal having synchronizing components corresponding to the afore-mentioned synchronizing signal. In one embodiment, for example, the carrier-modulated sync signal is derived from a received telecast applied to the amplifier circuits of the scanner receiver and is supplied to a sync separator to develop the desired synchronizing signal. In another embodiment, the synchronizing signal is generated locally by means of horizontal and vertical frequency oscillators. Where a conventional television receiver is utilized as the scanner of the transmitter unit, the locally generated synchronizing signal is modulated upon a suitable carrier in one of the standard television frequency ranges to be applied to the scanner receiver for controlling its operation. Where a separate scanning device is employed, the synchronizing signal may be utilized directly to control scansion of the picture tube. The transmitter unit further includes photo-sensitive transducer means for generating a video picture signal modulated in accordance with light projected from the luminescent screen of the scanner. In the usual application, an image-bearing device is utilized to modulate the light output from the scanner and thus afforded suitable modulation for the output from the photo-sensitive transducer; this image-bearing device, may, for example, comprise a transparency mounted directly upon the luminescent screen of a scanner picture tube. In other instances, however, the light output from the scanner may be modulated by applying a suitable signal to the scanner picture tube. The video picture signal developed by the photo-sensitive transducer is applied to an adding circuit along with the aforementioned synchronizing signal; the adding circuit combines these signals to develop a composite video signal. This composite video signal is then transmitted to the monitor receiver to effect visual reproduction of the video information included therein. Preferably, the transmission means includes a modulator device for modulating the composite video signal upon a standard-frequency television carrier before transmission to the monitor receiver in order that the signal may be applied directly to the antenna terminals of the monitor receiver and may be reproduced without any change in or connection to the internal circuitry of the monitor. Transmission may be effected by means of a conventional transmission line where a closed circuit system is desired; on the other hand, the carrier-modulated signal may be radiated from an antenna in the usual manner and picked up by the monitor receiver antenna.

In its other aspect, the invention is directed to a method of television transmission in which a first television receiver is operated as a scanner and at least one additional conventional television receiver is employed as a monitor. A synchronizing signal is generated and the scanner receiver is set in operation and adjusted to develop upon its luminescent screen a substantially unmodulated luminous raster in synchronism with the synchronizing signal. The light output from the scanner receiver is modulated by supporting an image-bearing device in predetermined position with respect to the luminescent screen of the receiver. A video picture signal corresponding to the modulated light output of the scanner receiver is developed and is combined with the synchronizing signal to generate a composite video signal. This composite video signal is modulated with a carrier signal having a frequency substantially equal to a standard television frequency and the carrier-modulated composite video signal is applied to the monitor receiver to reproduce the image carried by the image-bearing device.

Other and further objects of the present invention will be apparent from the following description and claims and are illustrated in the accompanying drawings which, by way of illustration, shows preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
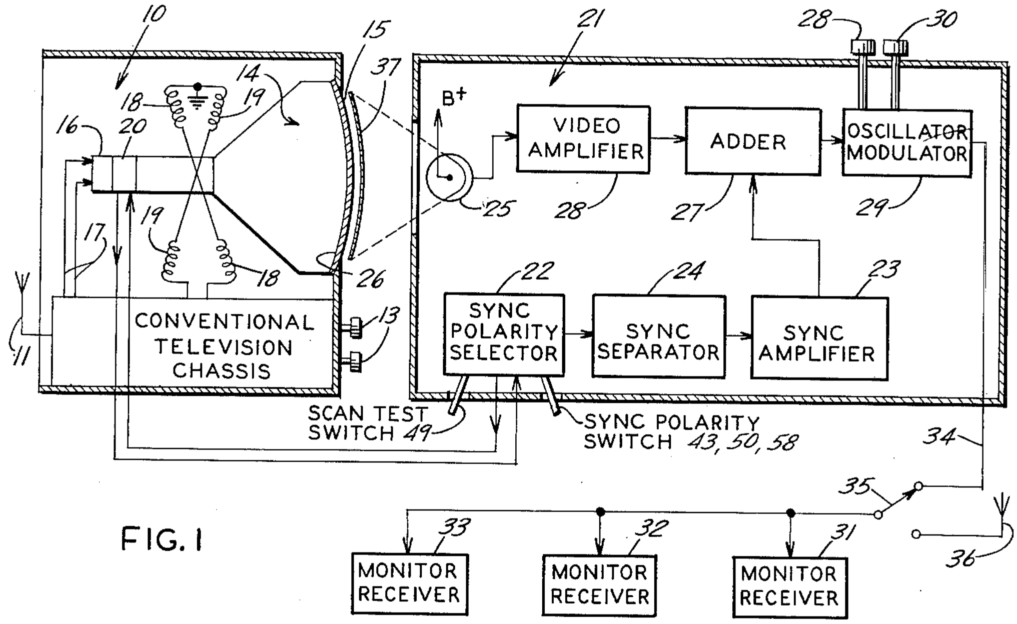
FIG. 1 is a block diagram of a closed circuit television transmission system including a transmitter unit constructed in accordance with one embodiment of the invention.

The closed circuit television transmission system illustrated in FIG. 1 includes a conventional television receiver 10 which, in the illustrated system, is utilized as a scanner and consequently comprises a portion of the transmitting terminal equipment. Scanner receiver 10 may comprise any conventional broadcast television receiver; there is no necessity that its picture tube be of any particular size, nor need the receiver include any special circuitry. It is, of course, necessary that the scanner receiver be in good working order. Scanner receiver 10 is coupled to the usual antenna 11, which may comprise either an internal or external antenna adequate to permit reasonably good operation of the receiver on at least one reliable television channel. Receiver 10 further includes the usual conventional television chassis 12, including suitable demodulating and amplifier circuits and the usual sweep signal generating means. Scanner receiver 10 also includes means for adjusting the contrast, brightness, and horizontal and vertical linearity and drive of the receiver along with other controls indicated, the receiver controls being indicated generally in the drawing by the control knobs 13.

The picture tube 14 of scanner receiver 10 is mounted behind the usual safety faceplate 15 and the gun electrodes of the picture tube are suitably connected to television chassis 12 through a tube socket 16 and the usual connecting leads indicated at 17. The deflection system of picture tube 14, in the illustrated apparatus, is of the electromagnetic type and comprises a pair of horizontal deflection coils 18 and a corresponding pair of vertical deflection coils 19. It should be understood that the particular type of deflection system utilized in scanner receiver 10 is not critical insofar as the present invention is concerned; any of the many well known types of electrostatic and/or electromagnetic deflection structures may be employed without substantially affecting the invention.

The conventional television receiver 10 comprising the scanner of the transmission system illustrated in FIG. 1 is modified in only one extremely minor respect in order to permit its use as a part of the transmitting terminal equipment in the system. An adapter socket 20 is interposed between the usual picture tube socket 16 and the electrical connector pins of picture tube 14. Adapter socket 20 and a camera 21 together comprise the transmitter unit of the invention and, in the embodiment illustrated, constitute the totality of special equipment required for the closed circuit television system except for additional conventional television receivers.

Adapter socket 20 is connected to a synchronizing signal polarity selector 22 included within camera 21. Sync polarity selector 22 is coupled to a synchronizing signal amplifier 23 through a sync separator 24. A photo-sensitive transducer device, shown in the illustrated embodiment as a photocell 25, is included in camera 21 and is positioned to intercept light from the luminescent screen 26 of scanner picture tube 14. Photocell 25 is coupled to an adder 27 through a conventional video amplifier 28, and the output stage of sync amplifier 28 is also coupled to the adder circuit. The adder circuit is coupled to an oscillator-modulator circuit 29 which includes a tuning control 30. Circuit 29 is also provided with a picture polarity or modulation control 28 to be described more completely hereinafter. The output of oscillator-modulator 29 is connected to one or more conventional television receivers, indicated in the drawing as three monitor receivers 31, 32, and 33, by means of a transmission line 34 to complete the closed circuit television system. Preferably, conventional twin-lead 300 ohm line is employed for transmission line 34, since most broadcast receivers are constructed for use with this type of input line. A single-pole double-throw switch 35 may be connected in series with transmission line 34, the second pole of switch 35 being connected to a separate antenna 36 to permit ready conversion of monitor receivers 31–33 from closed circuit to conventional broadcast operation.

The closed circuit system as thus far described is complete except for the means for introducing an image into the transmitter for translation to monitor receivers 31–33. In the illustrated embodiment, this is accomplished by supporting an image-bearing device 37 in juxtaposition to luminescent screen 26 of scanner picture tube 14. Preferably, image-bearing device 37 comprises a transparency and is mounted directly upon safety glass 15 of receiver 10 or, if no safety glass is present, directly upon the face plate of picture tube 14. Transparency 37 is thus interposed between luminescent screen 26 and photocell 25 and serves to modulate the light ouput from picture tube 14 in accordance with the image which the transparency carries. This relationship may perhaps be more completely understood by reference to FIG. 2. As indicated in this view, transparency 37 may include an image representative of a standard television alignment test pattern and may be affixed directly to the face plate of picture tube 14 by transparent adhesive tape or by any other suitable means. Transparency 37 may, of course, include an image representative of any type of information which it is desired to transmit through the closed circuit system; for example educational graphs, advertising messages, pictures, and other graphic materials are all well suited for transmission in the disclosed system. Moreover, a slide holder or similar apparatus may be utilized to support image-bearing device 37 in close proximity to luminescent screen 26 in order to permit rapid and efficient substitution of other image-bearing devices for transparency 37. Preferably, transparency 37 should be centered with respect to the faceplate of picture tube 14, as will be made more apparent hereinafter.

Figures 2, 4:
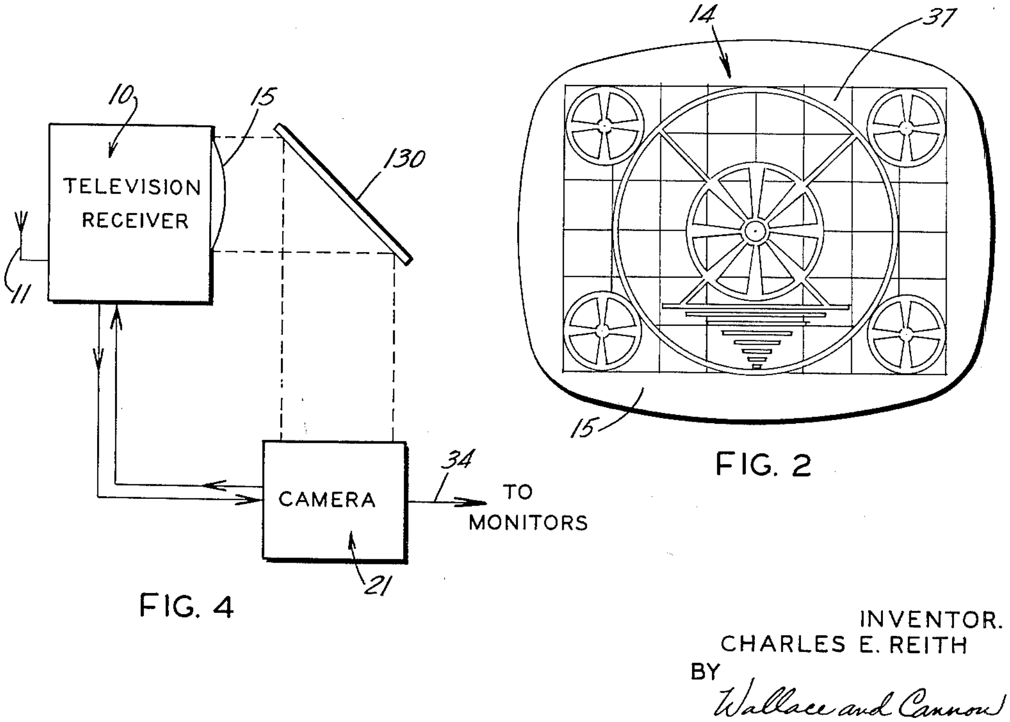
FIG. 2 is a front view of the scanner unit of the closed circuit television system of FIG. 1, showing the preferred method of modulating the light output from the scanner.
FIG. 4 is a block diagram of another embodiment of the invention.

The method aspect of the present invention can best be considered in relation to FIGS. 1 and 2, which represent one form of apparatus capable of carrying out the inventive process. Conventional television receiver 10 is first set in operation and is adjusted to provide a substantially unmodulated luminous raster at screen 26 of picture tube 14. This is accomplished by tuning receiver 10 to a local television broadcast, that broadcast being utilized in the receiver to synchronize the vertical and horizontal scanning of picture tube 14 in the usual manner through sweep signals applied to deflection system 18, 19. In order to prevent modulation of the light output of picture tube 14 which would otherwise be caused by the received telecast, an attenuator circuit, which may be incorporated in sync polarity selector 22, is interposed between television chassis 12 and the electron gun of picture tube 14 as by means of the adapter socket 20. The light output from screen 26 is modulated in accordance with a desired image by mounting the image-bearing transparency 37 in the illustrated position between screen 26 and camera 21. Preferably, controls 13 of scanner receiver 10 are adjusted so that the size of the luminous raster upon screen 26 corresponds in overall dimensions to transparency 27; thus, the total light output from picture tube 14 is modulated by the transparency. As the electron beam in picture tube 14 scans luminiscent screen 26, it develops a traveling spot of light which varies in effective intensity, depending upon the density of the image carried by transparency 37. Consequently, photocell 25 generates a video picture signal which is similarly modulated in intensity in accordance with the scansion of that image. At the same time, the synchronizing signal components of the received telecast normally applied to picture tube 14 are utilized in synchronizing signal circuits 22–24 to develop a synchronizing signal for use in the closed circuit television system.

The video picture signal developed by transducer 25 is amplified and is combined with the synchronizing signal from sync amplifier 23 to develop a composite video signal which is essentially similar in form to a standard television signal. This composite video signal is modulated with a carrier signal in circuit 29; preferably, the carrier signal has a frequency substantially equal to a standard television carrier frequency in the VHF range. Monitor receivers 31–33 are then energized and adjusted for operation at that standard television frequency and the carrier-modulated composite video signal is supplied to the monitor receivers by means of the closed circuit comprising transmission line 34 to reproduce the image from transparency 37 at each of the monitor receivers.

For best results, a definite operating procedure should be followed in conjunction with the closed circuit television system diagrammatically illustrated in FIGS. 1 and 2. The carrier frequency of the oscillator-modulator circuit should be adjusted to correspond to the carrier frequency of the received telecast employed to control scanner receiver 10 whenever this is practicable, since it has been found that this gives best results in sync stability; however, excellent results may be obtained with the camera operating on a different channel from the scanner. Transparency 37 should be mounted as closely as possible to luminescent screen 26 in order to avoid dispersion and scattering effects in light from the luminous raster prior to modulation by transmission through the transparency. For similar reasons, camera 21 should be mounted relatively close to picture tube 14; in the preferred apparatus embodiment to be described in detail in connection with FIG. 3, a spacing of the order of ten inches between photocell 25 and picture tube 14 has been found to give the best results. In this connection it should be noted that an increase in the spacing between camera 21 and picture tube 14 effectively reduces the brightness of the images reproduced by monitor receivers 31–33 and that the amount of light from the picture tube collected by the photocell determines the modulation strength or contrast of the transmitted picture.

Scanner receiver 10 should be adjusted for maximum stability in both vertical and horizontal scanning before the closed circuit system is placed in operation. However, it may be necessary to readjust the sync controls of the scanner during operation if the images at monitor receivers 31–33 exhibit the usual rolling or tearing effects caused by sync instability. This readjustment or testing may be accomplished by applying low-level modulation to picture tube 14 corresponding to the received telecast which controls synchronization of the system. The picture developed by image reproducer 14 under these circumstances may be extremely poor, but gives a reliable indication of the sync stability of scanner receiver 10 and hence of the remainder of the system. Generally speaking, the best results in both definition and stability of the images reproduced at monitors 31–33 may be obtained by establishing the carrier signal of camera 21 at the same frequency as the carrier for a locally used television channel, since monitor receivers 31–33 can normally be best adjusted for operation at that carrier frequency.

The method of closed circuit television transmission set forth above is extremely simple and permits utilization of standard television receivers as the principal components at both terminals of the system. No extensive modification of either the scanner or monitor receivers is required; in fact, the only modification of the receivers at either terminal of the system is the interposition of adapter socket 20 between picture tube socket 16 and picture tube 14. The scanner receiver 10 functions as a flying spot scanner in a manner somewhat similar to film-scanning equipment employed in some conventional broadcast transmitting arrangements. Camera 21, the major component of the transmitting unit, is relatively simple in construction and operation, as will be more completely appreciated from the description of FIG. 3 included hereinafter. Monitor receivers 31–33 are permitted to serve a dual purpose, since they may be reconverted to normal broadcast reception simply by throwing switch 35 to connect their antenna terminals to the separate antenna 36.

Figure 3:
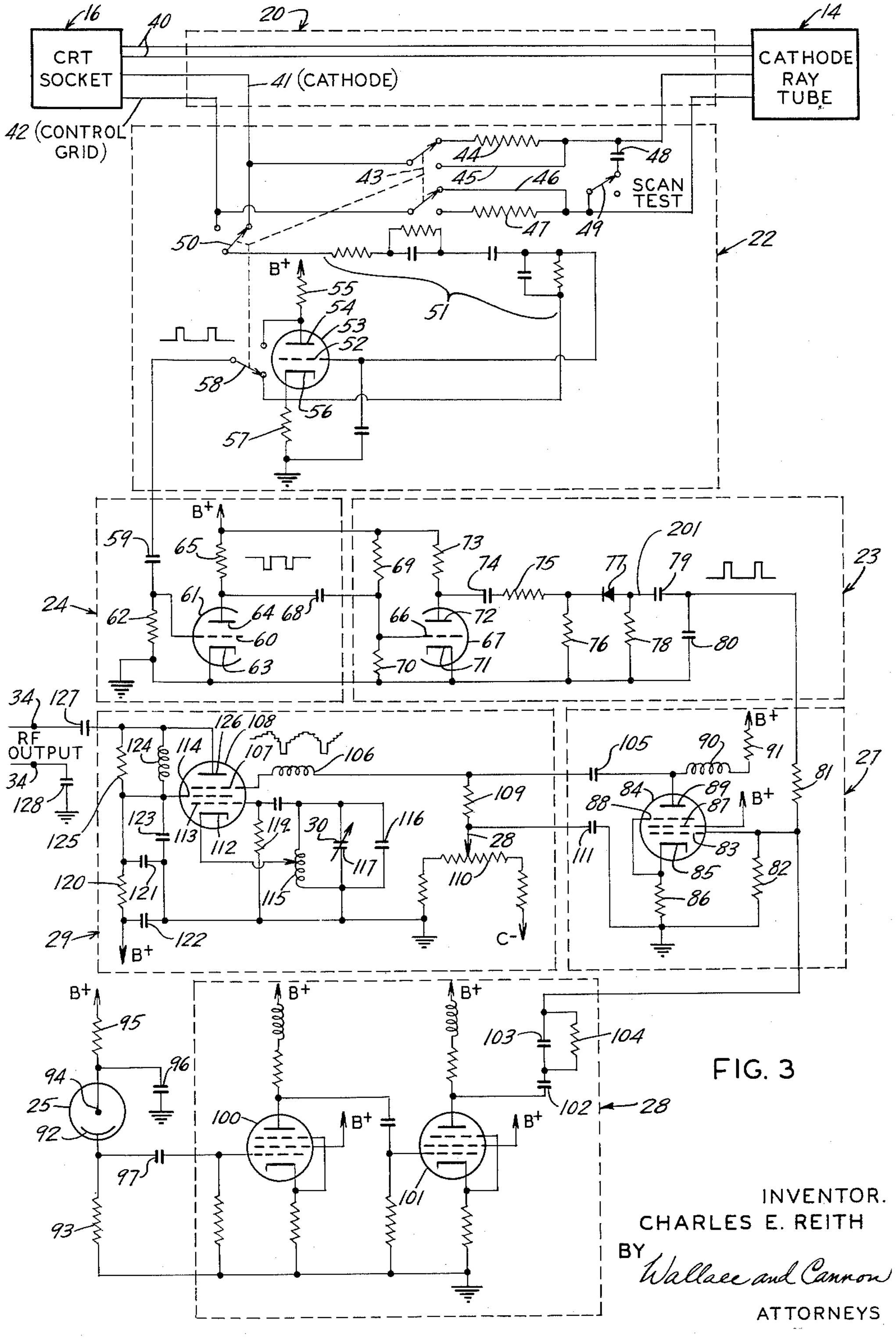
FIG. 3 is a schematic diagram of the electrical circuitry of one embodiment of the transmitter unit of FIG. 1.

The schematic diagram of FIG. 3 illustrates a preferred embodiment of the electrical circuitry of the transmitting unit comprising the adapter socket 20 and camera 21 of FIG. 1. In this preferred embodiment, adapter socket 20 includes several leads 40 which extend directly from picture tube socket 16 to picture tube 14, including the filament and focus voltage leads. The modulation electrode leads, however, are diverted to sync polarity selector 22; usually, it is desirable to divert both the cathode lead 41 and the grid lead 42, since either of these two electrode leads may be employed to apply modulation signals to the picture tube, depending upon the particular design employed by the manufacturer of scanner receiver 10 (FIG. 1). Modulation electrode leads 41 and 42 are connected to a double-pole double-throw switch 43. The terminal of switch 43 connected to cathode lead 41 may be connected to cathode ray tube 14 through an attenuator resistor 44 or through a direct conductive connection 45, depending upon the position of switch 43. Similarly, grid lead 42 is connected to cathode ray tube 14 through either a direct connection 46 or an attenuator resistor 47, depending upon the position of switch 43. If, in the particular receiver utilized as a scanner in the closed circuit system, the cathode lead is utilized to apply modulation signals to the picture tube, switch 43 is thrown to the position illustrated in FIG. 3 with resistor 44 connected in series with the cathode of the picture tube and with control grid lead 42 connected directly to the picture tube. On the other hand, when the scanner receiver utilizes the control grid of the picture tube for modulation, switch 43 is thrown to its alternate position with attenuating resistor 47 connected in series with the grid lead and with the cathode connected directly back to socket 16. Additional attenuation in the modulation circuit of picture tube 14 is provided by a bypass capacitor shunted across the grid-cathode circuit of the picture tube. A switch 49 of the single-pole double-throw type is connected in series with capacitor 48; in the normal operating or "Scan" position, as illustrated in the drawing, capacitor 48 is effectively connected in shunt across the grid and cathode of the picture tube; switch 49 may be thrown to its alternative or "Test" position to effectively remove bypass capacitor 48 from the circuit as will be described more completely hereinafter.

The cathode and grid leads 41 and 42 are also connected to the two independent terminals of a single-pole double-throw switch 50, the common terminal of the switch being connected to a filter circuit 51. One lead from filter circuit 51 is connected to the control electrode 52 of a phase-splitter amplifier tube 53; in the illustrated embodiment tube 53 is a conventional triode having an anode 54 connected to a source of positive unidirectional operating potential B+ through a resistor 55 and having a cathode 56 connected to ground through a resistor 57. Anode 54 is also connected to one terminal of a single-pole double-throw switch 58, the other or alternative terminal of the switch being connected back to filter circuit 51. Switches 43, 50, and 58 are preferably ganged for operation from a single control element or lever and comprise the sync polarity switch of the transmitter unit (FIG. 1).

The common terminal of switch 58 is coupled through a capacitor 59 to the control electrode 60 of a sync separator tube 61 which comprises the principal circuit element in sync separator 24 (FIG. 1). Control electrode 60 is also connected to ground through an input resistor 62. The cathode 63 of the tube 61 is connected to ground and the anode 64 of the sync separator tube is connected to B+ through a load resistor 65. Anode 64 is also coupled to the control electrode 66 of a sync amplifier tube 67 included in sync amplifier circuit 23 (see FIG. 1); the coupling circuit comprises a coupling capacitor 68 and a voltage divider comprising a pair of resistors 69 and 70 connected between B+ and ground, capacitor 68 and control electrode 66 being connected to the common terminal of resistors 69 and 70. The cathode 71 of tube 67 is grounded and the anode 72 of the sync amplifier tube is returned to B+ through a load resistor 73.

Sync amplifier circuit 23 includes a filter and attenuator circuit in its output stage; this filter-attenuator stage comprises a coupling capacitor 74 connected to anode 72, a series resistor 75, and a shunt resistor 76 which is returned to ground. The common terminal of resistors 75 and 76 is connected to the anode of a diode 77, the cathode of diode 77 being connected to ground through a resistor 78. A coupling capacitor 79 is also connected to the cathode of diode 77, the other terminal of the coupling capacitor being bypassed to ground through a capacitor 80. Diode 77 may be of the vacuum tube type, but preferably comprises a germanium crystal diode such as type 1N34 or 1N60.

The output stage of sync amplifier 23 is coupled through capacitor 79 and a voltage divider comprising two series-connected resistors 81 and 82 to the control electrode 83 of an amplifier tube 84 included in signal adder circuit 27, the control electrode being connected to the common terminal of the two voltage divider resistors, with resistor 82 returned to ground to function as an input resistor for the adder amplifier. The cathode 85 of tube 84 is connected to ground through a bias resistor 86. In the illustrated embodiment, tube 84 comprises a conventional pentode; the screen electrode 87 of the tube is connected to B+ and the suppressor electrode 88 is connected to cathode 85. The anode 89 of adder tube 84 is returned to B+ through a load circuit comprising a peaking coil 90 connected in series with a load resistor 91. Of course, other adder circuit arrangements may be employed; for example, resistor 81 may be connected to anode 89 of the adder tube rather than to control electrode 83 if desired.

The cathode 92 of the transducer photocell 25 is connected to ground through a load resistor 93, whereas the anode 94 of the photocell is connected to B+ through a resistor 95 which is bypassed to ground through a capacitor 96. A coupling capacitor 97 connected to cathode 92 of photocell 25 is utilized to couple the photocell to the input of a conventional two stage video amplifier 28 comprising two pentodes 100 and 101. Video amplifier circuit 28 is essentially conventional and consequently need not be described in detail. The output circuit of the video amplifier comprises a frequency equalizer circuit including a pair of capacitors 102 and 103 connected in series with each other between the anode of the second amplifier tube 101 and the input resistor 82 of adder stage 27. The frequency equalizer network further includes a resistor 104 connected in shunt with capacitor 103.

The output circuit of adder 27 comprises a coupling capacitor 105 having one terminal connected to anode 89 of adder tube 84 and having the other terminal connected to the input circuit of modulator-oscillator 29. The input circuit of the modulator-oscillator circuit includes a choke coil 106 connected in series with coupling capacitor 105 and the suppressor electrode 107 of a pentode 108. The common terminal of capacitor 105 and coil 106 is also connected to an input resistor 109, the other terminal of the input resistor being connected to a source of negative bias potential C− through a potentiometer 110 which constitutes the modulation or picture polarity control 28 of the transmitter unit (FIG. 1). Resistor 109 is bypassed to ground through a capacitor 111.

The cathode 112, control electrode 113, and screen electrode 114 of pentode 108 are connected in a modified Hartley oscillator circuit. The tank circuit of the oscillator comprises a coil 115 across which are connected a fixed tuning capacitor 116 and a variable tuning capacitor 117; variable capacitor 117 comprises the tuning control 30 of the transmitter unit (see FIG. 1). One terminal of coil 115 is grounded and the other terminal is coupled to control electrode 113 through a coupling capacitor 118, the control electrode also being connected to ground through a resistor 119. Cathode 112 is connected to a center tap on coil 115. Screen electrode 114, on the other hand, is connected to B+ through a filter circuit comprising a series resistor 120 and a pair of shunt capacitors 121 and 122, the other terminals of the capacitors being grounded. Screen electrode 114 is also bypassed to ground for extremely high frequencies by a capacitor 123.

The output circuit of oscillator-modulator tube 108 comprises a parallel R-L circuit comprising a choke coil 124 and a resistor 125 connected between the anode 126 of tube 108 and the screen electrode 114. A coupling resistor 127 is utilized to couple anode 126 to the transmission line 34 of the transmitter unit, the second lead of the transmission line being bypassed to ground through a capacitor 128.

The operational features of the transmitter unit shown in detail in FIG. 3 are discussed in general above in connection with FIGS. 1 and 2. As previously indicated, adapter socket 20 is interposed in the scanner receiver between cathode ray tube socket 16 and picture tube 14 and bypasses the cathode and control grid circuits 41 and 42 to sync polarity selector 22. Assuming that the scanner receiver is one in which the cathode is employed as the modulation electrode, switches 43, 50, and 58 are thrown to their respective positions illustrated in FIG. 3. This action interposes attenuator resistor 44 in the modulation electrode (cathode) circuit and reduces the modulation voltage applied to picture tube 14 to an extremely low value. At the same time, the circuit established by switches 50 and 58 couples the composite video signal of the received telecast to control electrode 60 of sync separator 24 with a polarity such that the sync pulses included in the video signal are positive-going. If, on the other hand, the scanner receiver is one in which the grid is utilized as the modulation electrode, the sync polarity switch mechanism is moved to its alternate position. Under these circumstances, the attenuation resistor 47 is interposed in the grid circuit and the negative-going sync pulses in the received video signal are inverted and amplified in tube 53 before they are applied to sync separator tube 61. Consequently, by throwing a single switch lever, the scanner receiver may be completely adjusted for operation where either the cathode or grid electrodes of the picture tube are employed as the modulation electrode. Of course, separate switch actuation devices may be employed for switches 43, 50, and 58 if desired. For normal operation, scan-test switch 49 remains in the position illustrated with capacitor 48 shunting the grid and cathode leads.

Triode 61 of sync separator 24 function as a conventional sync clipper; the output signal from tube 61 comprises a series of negative-going sync pulses which are amplified and inverted in sync amplifier tube 67. The positive-going sync pulse signal appearing at the output of tube 67 is applied to diode 77 through the attenuator circuit comprising capacitor 74 and resistors 75 and 76 which reduces the output pulses to approximately two volts in amplitude. The diode functions as a filter to eliminate any negative-going video signals which might be present in the sync signal at this point. The positive-going sync output from amplifier circuit 23 is then applied to pentode 84 of adder circuit 27 through the voltage divider comprising resistors 81 and 82.

At the same time, and as described above, photocell 25 generates a video picture signal modulated in accordance with the image carried by transparency 37 (FIG. 1) and applies that signal to the two-stage video amplifier circuit 28. The amplified video picture signal is applied to the input resistor 82 of adder tube 84 so that the output signal from the adder tube includes both synchronizing pulse and video components. This composite video signal is essentially similar in form to the corresponding signal developed at a conventional transmitter.

The oscillator section of tube 108 is adjusted to provide a carrier signal at one of the predetermined standard television frequencies by suitable adjustment of tuning control 30. The composite video signal from adder 27 is applied to the suppressor electrode 107 of tube 108 to modulate the carrier signal in the usual manner. Preferably, the amplitude of the composite video signal as applied to grid 107 is sufficient to cut off the tube upon occurrence of each sync pulse, so that the oscillator is effectively blanked each time a sync pulse appears in the input signal. The output signal from tube 108, which is essentially similar in form to the carrier-modulated video signal radiated for a standard telecast, is applied to transmission line 34 and utilized in the monitor receivers to reproduce the image carried by transparency 37 (FIG. 1).

To check stability of the transmitter unit of FIG. 3, switch 49 may be thrown to the "Test" position, thereby effectively removing shunt capacitor 48 from the input circuit of picture tube 14. This permits a relatively weak but nonetheless visible modulation signal to be applied to the picture tube and makes it possible to determine whether or not the scanner receiver is properly synchronized with the received telecast. The modulation level or percent modulation of the output signal from modulator circuit 29 may be adjusted as desired by varying potentiometer 28 to adjust the negative bias on grid 107 of modulator tube 108.

FIG. 4 illustrates a somewhat different form of apparatus which may be utilized to carry out the inventive method. In this figure, which shows only the transmitter terminal equipment, a conventional television receiver 10 is utilized as a flying spot scanner in the same manner as described in connection with FIG. 1 to control the output signal from a camera 21 which may be essentially similar to the previously described camera unit. In this embodiment, however, modulation of the light output from the scanner receiver is not effected by interposing a transparency between the scanner receiver and the camera unit. Rather, the image-bearing device in this instance comprises a mirror 130 which carries an image in the form of light-absorptive material. Device 130 is positioned at an angle with respect to the scanner receiver screen to reflect light originating at the screen to impinge upon camera 21. By this method, only selected portions of the light from screen 15 of receiver 10 are reflected to impinge upon the photo-sensitive transducer of camera 21, thereby affording the desired modulation of the camera output signal. This arrangement is somewhat more complex and difficult to construct than the embodiment of FIGS. 1 and 2, but does permit direct viewing of the image without interference from the camera, provided a half-silvered mirror is utilized as the image-bearing device.

As indicated above, it is a relatively simple matter to change the image transmitted through the closed circuit system of the invention, particularly where a slide holder or other similar apparatus is employed to support the image-bearing device in the required position with respect to the luminescent screen of the scanner receiver. In this connection, it should also be noted that, where the system is employed for lecturing or similar purposes, it is readily possible to interpose a pointer or other device between transparency 37 and photocell 25 (FIG. 1) to direct the viewers' attention to particular parts of the image being transmitted through the system. This arrangement is particularly useful in educational uses of the system. Despite the fact that the pointer may be spaced from the transparency or may extend at an angle with respect thereto, little or no distortion is introduced into the reproduced image of the transparency and pointer, since there are no optical elements in the camera unit. In this connection, it should be noted that although it is of course possible to utilize a wide variety of lenses and other optical devices in the transmitter unit of the invention, these are totally unnecessary, at least in the direct-view embodiment of FIGS. 1 and 2. The simple arrangement illustrated, without lenses or other optical elements, provides excellent detail and resolution comparable to a first rate conventional telecast.

In order to provide a more complete and detailed disclosure of the invention, certain of the circuit parameters and tube types are set forth hereinafter. It should be understood that this material is included solely by way of illustration and in no sense as a limitation upon the invention.

*Tubes*

| | |
|---|---|
| 25 | RCA929 |
| 53 | 6C4 |
| 61–67 | 12AU7 |
| 77 | 1N34 or 1N60 |
| 84 | 6BH6 |
| 108 | 6BH6 |

*Resistors*

| | | |
|---|---|---|
| 44, 47 | kilohms | 47 |
| 62 | megohms | 2.2 |
| 69 | kilohms | 680 |
| 70 | do | 22 |
| 75 | do | 15 |
| 76 | do | 4.7 |
| 81 | do | 10 |
| 82 | do | 5.1 |
| 93 | do | 8.2 |
| 95 | megohm | 1 |
| 120 | kilohms | 47 |
| 125 | ohms | 300 |

*Potentiometer 110*

| | | |
|---|---|---|
| Ground leg | kilohms | 3.3 |
| Center leg | do | 15 |
| C-leg | do | 22 |

*Capacitors*

| | Microfarad |
|---|---|
| 48 | 1 |
| 59 | 0.01 |
| 68 | 0.05 |
| 74 | 0.05 |
| 79 | 0.1 |
| 97 | 0.1 |
| 105 | 0.1 |
| 121 | 5 |
| 122 | 0.005 |

*Voltages*

| | Volts |
|---|---|
| B+ | 115 |
| C− | 35 |

Figure 5:
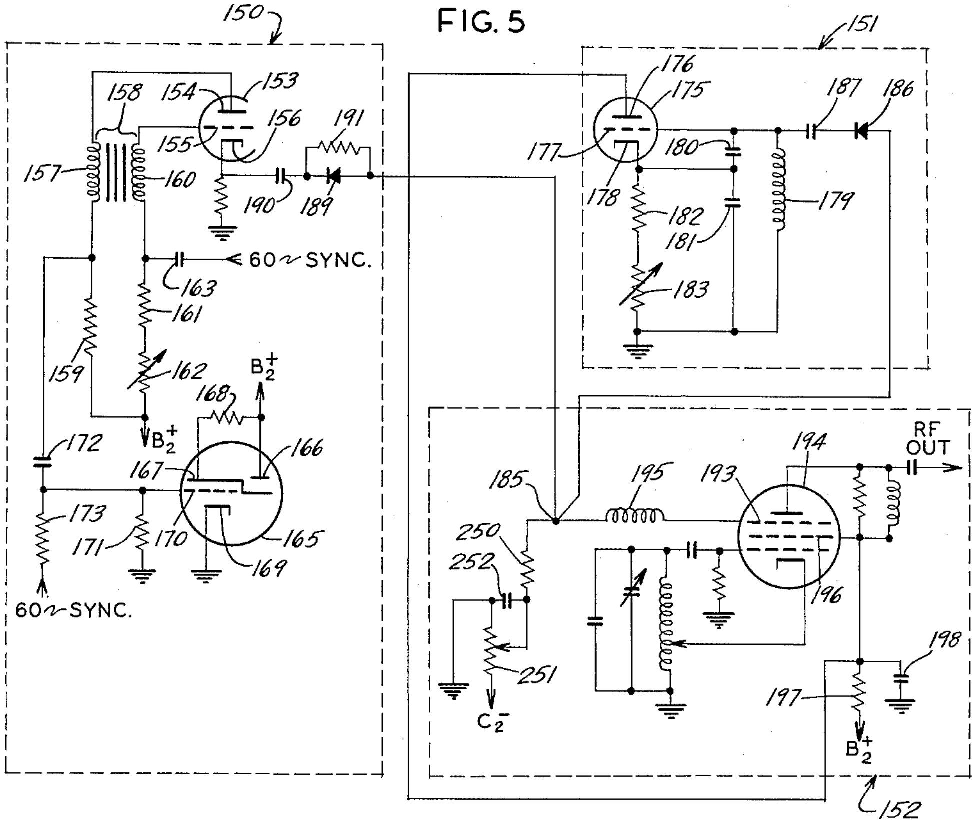
FIG. 5 is a schematic diagram of a synchronizing signal generator which may be utilized in conjunction with another embodiment of the invention.

In at least some instances, it may be desirable to utilize the television system of the invention in a location where no local telecast is available as a source of synchronizing signals. Moreover, it has been determined that it is some times advantageous to generate a locally controllable synchronizing signal for reasons set forth more completely hereinafter. Under these circumstances, the structure and operation of the overall system may be modified by providing a local interlace raster signal generator, one embodiment of which is illustrated in FIG. 5. The synchronizing or raster signal generator shown in FIG. 5 comprises three major circuits, a vertical sync generator 150, a horizontal sync generator 151, and an oscillator-modulator circuit 152.

Vertical sync generator 150 includes an oscillator tube 153 having an anode 154, a control electrode 155 and a cathode 156. Anode 154 is connected to one end of a first winding 157 of a transformer 158, the other end of winding 157 being connected through a resistor 159 to a source of positive unidirectional operating potential B2+. Control electrode 155 is connected to the second winding 160 of transformer 158, the other end of winding 160 being connected to source B2+ through the series combination of a fixed resistor 161 and a variable resistor 162. Winding 160 is also coupled to a source of 60 cycle synchronizing signals such, for example, as a local power line, through a coupling capacitor 163.

The vertical sync generator 150 further includes an indicator circuit comprising a conventional indicator tube 165. The two anodes 166 and 167 of the indicator tube are connected to each other through a resistor 168; in addition, anode 166 is directly connected to D.C. source B2+. The cathode 169 of the indicator tube is grounded and the control electrode 170 is coupled to the oscillator by means of a coupling circuit including an input resistor 171 and a coupling capacitor 172, the other terminal of the coupling capacitor being connected to the common junction of winding 157 and resistor 159. Control electrode 170 is also coupled to a source of 60 cycle synchronizing voltage through a resistor 173.

Horizontal sync generator 151 comprises a triode 175 having an anode 176, a control electrode 177, and a cathode 178. The triode is connected in a modified Colpitts oscillator circuit, the resonant circuit for the oscillator including a coil 179 connected in parallel with two series-connected capacitors 180 and 181. Control electrode 177 is connected to one end of coil 179, the other end of the coil being grounded, and cathode 178 is connected to the common terminal of capacitors 180 and 181. Cathode 178 is also grounded through the series combination of a fixed resistor 182 and a variable resistor 183.

The vertical sync generator 150 and horizontal sync generator 151 are individually coupled to a common output terminal 185 to provide a synchronizing signal including both vertical and horizontal frequency components. Thus, the common terminal 185 is coupled to the tank circuit of the horizontal oscillator through a diode 186 connected in series with a capacitor 187. Similarly, terminal 185 is connected to the cathode of the vertical-frequency oscillator through the series combination of a diode is shunted by a resistor 191. Terminal 185 is also connected to the suppressor electrode 193 of an oscillator-modulator tube 194 by means of a choke coil 195. The oscillator-modulator tube is connected in a circuit essentially similar to circuit 29 of FIG. 5; accordingly, the detailed circuit arrangement need not be repeated. Oscillator-modulator circuit 152 is preferably modified slightly in its output stage as compared with the previously-described modulator; the filter circuit comprising elements 120–122 of the modulator 29 are eliminated and the screen grid 196 of pentode 194 is returned to B2+ through a resistor 197 which is bypassed to ground through a capacitor 198. The anode 176 of the horizontal sync generator is also preferably returned to B2+ through this same circuit. The modulator circuit also includes a modulation-level control circuit including a resistor 250, one end of which is connected to input terminal 185, the other end of the resistor being connected to the variable tap on a potentiometer 251. One terminal of the potentiometer is grounded and the other is returned to a source of negative D.C. potential C2−. The variable tap on the potentiometer is also by-passed to ground through a capacitor 252.

Operation of the synchronizing signal generator illustrated in FIG. 5 is quite simple and will be readily apparent to those skilled in the art. The oscillator circuit comprising tube 153 produces a 60 cycle output signal controlled by the power line or other similar reference input signal applied to the oscillator through coupling capacitor 163. This same reference signal is applied to the indicator tube 165 along with a signal derived from the oscillator to afford a ready means of determining whether or not the oscillator is operating at the desired vertical scanning frequency. The indicator tube circuit is essentially conventional in operation and consequently need not be further described here. Adjustment of the vertical sync frequency is of course effected by adjusting resistor 162. The output circuit of the vertical sync generator, comprising diode 189, resistor 191, and capacitor 190, provides a pulse output at 60 cycles per second.

Horizontal sync generator 151, on the other hand, preferably is tuned to an odd multiple of 60 cycles, either the 261st or the 263rd harmonic thereof, in order to achieve line interlacing in the picture raster of a conventional television receiver controlled by the synchronizing signal generator. Thus, tank circuit 179–181 of the horizontal sync generator may be tuned to either 15,780 cycles or to 15,660 cycles.

The two synchronizing signals are applied simultaneously to a suppressor electrode 193 of oscillator-modulator tube 194 for modulation with a suitable carrier signal generated by the oscillator portion of the tube. Potentiometer 251 may be adjusted to establish the desired modulation level in the modular circuit. In the illustrated embodiment the output circuit of the modulator selects the second harmonic components of the modulated carrier; this same technique is preferably employed in modulator 29 of FIGURE 3, although operation on the oscillator fundamental may be followed if desired. The resulting carrier-modulated synchronizing signal is then coupled to the antenna input terminals of the scanner receiver 10 (FIG. 1) to control operation of the scanner receiver. Accordingly, it is not necessary to change any of the other portions of the transmitter unit to permit utilization of the synchronizing signal generator of FIG. 5; the camera and adapter units work in exactly the same way as described hereinabove to provide a television signal for controlling the monitor receivers of the system. Accordingly, the apparatus of FIG. 5 may be utilized in any instance where it is desired to afford an independent control for the transmission system, as when a local telecast is not available for synchronizing purposes or when it is not desired to employ a received telecast because of weak signal conditions or other factors.

Figures 6, 6A:
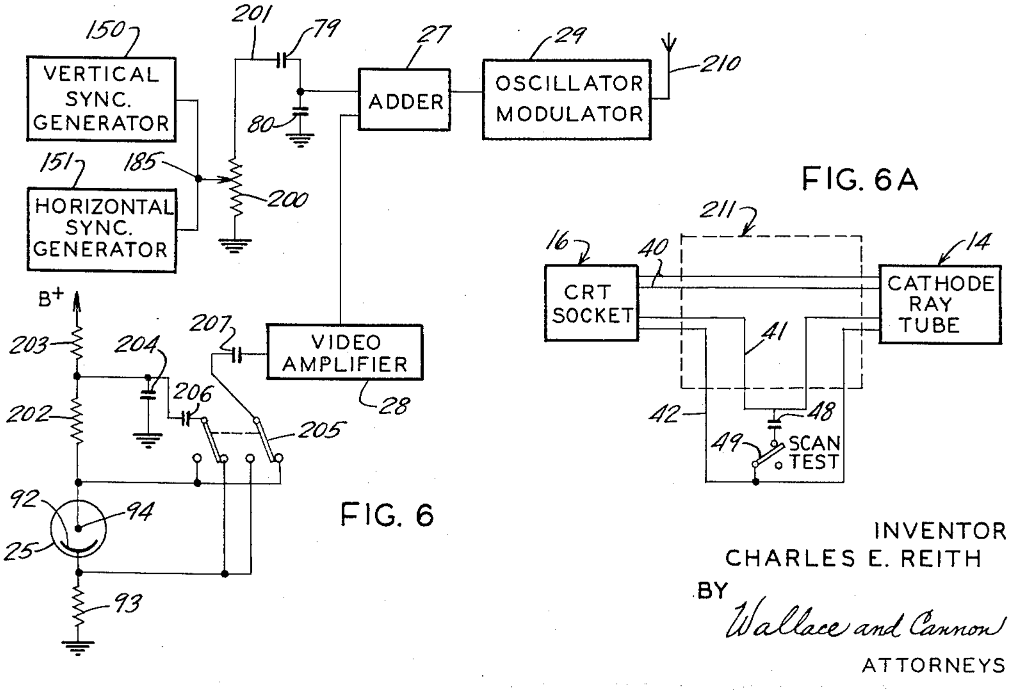
FIGS. 6 and 6A are block diagrams, showing some portions of the circuit in detail, of a further embodiment of the invention combining certain features of FIGS. 3 and 5.

FIGS. 6 and 6A illustrate a further embodiment of the invention which combines many of the features of FIGS. 1, 3, and 5. FIG. 6 shows the major circuits of this embodiment of the inventive transmission system and includes a vertical sync generator 150 and a horizontal sync generator 151; these sync generators may be essentially similar to the correspondingly numbered circuits of FIG. 5. As in the apparatus of FIG. 5, the two sync generators are coupled to a common terminal 185 which in this instance is connected to the variable tap on a potentiometer 200. One terminal of the impedance element of potentiometer 200 is grounded, whereas the other terminal is connected to an adder circuit 27 through a series coupling capacitor 79 and a shunt capacitor 80. It will thus be seen that the vertical and horizontal sync generators of FIG. 5 have geen effectively substituted in the circuit of FIG. 3 for sync polarity selector 22, sync separator 24, and sync amplifier 23, the connection being made at the point designated by numeral 201 in FIGURES 3 and 6. Adder 27 may be essentially similar to the previously described adder circuit; the input to the adder is also coupled to a video amplifier 28 as in the first-described embodiment.

The pick-up transducer of the system shown in FIG. 6 is in most respects quite similar to that of FIGS. 1 and 3, but has been modified slightly to provide for polarity selection if desired. Cathode 92 of the photocell 25 is again connected to ground through a resistor 93 and anode 94 is connected to D.C. source B+ through two series-connected resistors 202 and 203. Resistor 203 is bypassed to ground through a capacitor 204. Anode 94 is also connected to two terminals of a double-pole double-throw switch 205, cathode 92 being connected to the two antenna terminals of the switch. One of the output terminals of switch 205 is grounded through a capacitor 206, whereas the other output terminal of the switch is coupled to the video amplifier 28 through a capacitor 207. The output stage of adder 27, in this embodiment, is coupled to oscillator-modulator 29 as in the embodiment of FIGS. 1 and 3; in this instance, however, the output from modulator 29 is not applied to a closed-circuit transmission system. Rather, the carrier-modulated video signal from the modulator circuit is applied to a suitable antenna 21, for radiation in the usual manner to the monitor receivers.

FIG. 6A illustrates a suitable signal-attenuation arrangement for use in conjunction with the camera illustrated in FIG. 6. The attenuation circuit includes an adapter socket 211 which is interposed between the cathode ray tube socket 16 and the picture tube 14 of the scanner receiver in the same manner as adapter socket 20 of the embodiment of FIG. 3. As in the previous arrangement, certain of the picture tube leads 40 are carried through the adapter socket without interruption but the cathode and control grid leads 41 and 42 are brought out separately. In this embodiment, the attenuation circuit is much simplified as compared to that of FIG. 3, only the shunting capacitor 48 and the scan-test switch 49 being retained; these elements are connected in series between the control and cathode leads.

Operation of the embodiment of FIGS. 6 and 6A is in most respects similar to the systems described above. At the outset, the camera unit illustrated in FIG. 6 is placed in operation and develops a sync signal including both vertical and horizontal frequency components which are applied to modulator 29 through adder circuit 27 and radiated as a carrier-modulated synchronizing signal. This signal is applied to the scanner receiver; a closed coupling circuit may be employed for this purpose or, if no local station is broadcasting on the carrier frequency selected for modulator 29, the signal may be radiated from antenna 210 and picked up by antenna 11 of the scanner receiver (FIG. 1). The scanner receiver is energized and, of course, develops a luminous raster controlled in scanning frequency by the camera output signal. The light output from the scanner receiver is modulated in the manner described above and is utilized to develop a video picture signal in the transducer circuit comprising photocell 25. This video picture signal is applied to amplifier 28 and to adder 27 as indicated above. The system is prevented from oscillating by the attenuator arrangement shown in FIG. 6A, since the video portions of the output signal from the camera of FIG. 6 are effectively by-passed through capacitor 48 and thus prevented from modulating the light output of picture tube 14.

In many instances, it may be desirable to change the polarity of the video modulation in the system. Thus, for example, an ink graph or chart may be available only in the form of negative, whereas a positive reproduction thereof may be desired at the monitor receiver of the system. This change in effective polarity may be accomplished by moving switch 205 to its alternative position to derive the video picture signal from the anode rather than the cathode of cell 25. A similar provision for changes in modulation polarity may also, of course, be incorporated in the embodiment of FIG. 3.

In order to afford a more complete and detailed disclosure of the embodiments of FIGS. 5 and 6, certain of the circuit parameters and tube types for a typical system of this type are set forth hereinafter. This material is included solely by way of illustration and in no sense as a limitation upon the invention.

*Tubes*

| | |
|---|---|
| **153** and **175** | ½ 12AU7 |
| **166** | 6U5 |
| **186** and **189** | 1N34 |

*Resistors*

| | | |
|---|---|---|
| 159 | kilohms | 2.2 |
| 161 | megohms | 2.2 |
| 162 | do | 2.5 |
| 168 | do | 1.0 |
| 171 | do | 2.2 |
| 173 | do | 1.0 |
| 182 | kilohms | 4.7 |
| 183 | do | 2.0 |
| 191 | do | 15 |
| 197 | do | 22 |
| 200 | megohm | 1 |

*Capacitors*

| | Microfared |
|---|---|
| 162 | 0.005 |
| 172 | 0.01 |
| 187 | 0.001 |
| 190 | 0.05 |
| 198 | 20 |

*Voltages*

| | Volts |
|---|---|
| B2+ | 90 |
| C2− | 10 |
| 60 cycle reference | 6.3 |

An examination of FIG. 6 in conjunction with FIG. 1 will clearly indicate to those skilled in the art that the invention may also be applied to a system in which a specially-constructed scanning device is utilized at the transmitter instead of television receiver 10. For example, the synchronizing signals necessary for controlling scansion of picture tube 14 may be derived directly from sync generators 150 and 151 of the embodiment of FIG. 6 and applied to the picture tube deflection system 18, 19 without modulation upon a carrier and without subsequent transmission through the conventional television chassis of receiver 10. In this manner, a complete transmitter may be constructed utilizing the apparatus of FIG. 6 in conjunction with only the picture tube and deflection circuits of the embodiment of FIG. 1. This modification may be desirable in some instances for constructing a self-contained test-signal generator for use by repairmen in field work or in other similar applications. On the other hand, this arrangement may be more expensive than other embodiments of the invention as heretofore described in that it requires construction of a complete scanning device and does not permit utilization of a relatively low-cost conventional television receiver for this purpose. It will be appreciated that where the embodiments of FIGS. 1 and 6 are combined in this manner, eliminating transmission through the conventional television chassis, there is no requirement for an adapter socket such as devices 20 and 211 of FIGS. 3 and 6A, since the picture tube could not be affected by either a conventional telecast or the output signal from the camera unit.

As will be apparent from the foregoing description, the transmitter unit of the invention is extremely inexpensive, particularly in comparison with conventional transmitting apparatus. The economies afforded by the invention are to a substantial extent accomplished through changes in the scanning device employed at the transmitter unit, preferably through use of a conventional broadcast television receiver as a scanner or in some instances by employing a greatly simplified scanning apparatus. In the preferred embodiment of the invention, in which the scanner comprises an ordinary television receiver, the scanner itself may supply the essential synchronizing information so that an independent local synchronizing signal generator is not required. In other embodiments, an extremely inexpensive and greatly simplified synchronizing signal generator is utilized to control scanning operations in the system. The camera equipment for the transmitter is not complicated by any requirement for optical gear, thereby substantially reducing cost as compared with known arrangements. Virtually any receiver capable of reasonably good operation on a standard telecast may be employed as the scanner in any of the several embodiments, since the system is not dependent upon any particular type or size of scanner receiver. In this connection it should be noted that the scanner equipment in many instances represents virtually zero cost to a television repairman, since a repair shop usually has at least one unsalable but still operable receiver on hand. For other users, in many instances it is possible to purchase a small-screen receiver in excellent operating condition at a relatively nominal cost. Because the output signal from the transmitter, whether propagated by radiation or through a closed circuit, is essentially similar to a standard telecast, the monitor receivers need not be modified in any respect and can be utilized for standard broadcast reception as well as with the signal from the transmitter unit of the invention. As noted above, the invention may be employed to relay or rebroadcast a received telecast and it should be noted that, where such operation is contemplated, the transmitter unit may also be employed to insert additional or substitute commercial messages in the relayed program.

Hence while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A transmitter unit for a television transmission system comprising a first substantially unmodified conventional television receiver utilized as a scanner and at least one additional television receiver utilized as a monitor, said transmitter unit comprising: a synchronizing signal generator, including a horizontal-frequency oscillator and a vertical-frequency oscillator, for generating a synchronizing signal; means coupled to said synchronizing signal generator for modulating said synchronizing signal with a locally-generated carrier signal to develop a carrier-modulated synchronizing signal having synchronizing components corresponding to said synchronizing signal; means for applying said carrier-modulated synchronizing signal to said scanner receiver to control scanning of the picture tube in said scanner receiver; photosensitive transducer means for generating a video picture signal modulated in accordance with light projected from the luminescent screen of said scanner receiver; an adding circuit, coupled to said synchronizing signal generator and to said transducer means, for combining said synchronizing and video picture signals to develop a composite video signal; and transmission means for transmitting said composite video signal to said monitor receiver to effect visual reproduction of the video information included therein.

2. A transmitter unit for a television transmission system comprising a first substantially unmodified conventional television receiver utilized as a scanner and at least one additional television receiver utilized as a monitor, said transmitter unit comprising: synchronizing-signal take-off means, adapted to be coupled to said scanner receiver, for generating a synchronizing signal in response to a telecast received by said scanner receiver; means for modulating the light output from said scanner receiver; photosensitive transducer means for generating a video picture signal modulated in accordance with light projected from the luminescent screen of said scanner receiver; an adding circuit, coupled to said synchronizing-signal take-off means and to said transducer means, for combining said synchronizing and video picture signals to develop a composite video signal; and transmission means for transmitting said composite video signal to said monitor receiver to effect visual reproduction of the video information included therein.

3. A transmitter unit for a television transmission system comprising a first substantially unmodified conventional television receiver utilized as a scanner, an image-bearing device supported in predetermined position with respect to the luminescent screen of said scanner receiver, and at least one additional television receiver utilized as a monitor, said transmitter unit comprising: synchronizing-signal take-off means, adapted to be coupled to said scanner receiver, for generating a synchronizing signal in response to a telecast received by said scanner receiver, said take-off means including means for substantially eliminating modulation of light output from said scanner receiver in response to said telecast; photosensitive transducer means for generating a video picture signal modulated in accordance with light projected upon said image-bearing device from the luminescent screen of said scanner receiver; an adding circuit, coupled to said synchronizing signal generator and to said transducer means, for combining said synchronizing and video picture signals to develop a composite video signal; and transmission means for transmitting said composite video signal to said monitor receiver to effect visual reproduction of the video information included therein.

4. A transmitter unit for a closed circuit television transmission system comprising a first substantially unmodified conventional television receiver utilized as a scanner, an image-bearing device supported in juxtaposition to the luminescent screen of said scanner receiver, and at least one additional television receiver utilized as a monitor, said transmitter unit comprising: synchronizing-signal take-off means, adapted to be coupled to said scanner receiver, for generating a synchronizing signal in response to a telecast received by said scanner receiver; polarity-selective means for establishing said synchronizing signal at a predetermined polarity comprising a phase-splitting circuit and switching means for selecting synchronizing signals of opposite polarity in the output of said phase-splitting circuit; photo-sensitive transducer means for generating a video picture signal modulated in accordance with light projected upon said image-bearing device from the luminescent screen of said scanner receiver; an adder, coupled to said polarity-selective means and to said transducer means, for combining said synchronizing and video picture signals in predetermined polarity relationship to develop a composite video signal; and transmission means for transmitting said composite video signal to said monitor receiver to effect visual reproduction of the image carried by said image-bearing device.

5. In a closed circuit television transmission system comprising a first substantially unmodified conventional television receiver utilized as a scanner, an image-bearing device supported in predetermined relationship to the luminescent screen of said scanner receiver, and at least one additional television receiver utilized as a monitor, a transmitter unit comprising: synchronizing-signal take-off means, adapted to be coupled to said scanner receiver, for generating a synchronizing signal in response to a telecast received by said scanner receiver; photo-sensitive transducer means for generating a video picture signal modulated in accordance with light projected upon said image-bearing device from the luminescent screen of said scanner receiver; an adder, coupled to said synchronizing-signal take-off means and to said transducer means, for combining said synchronizing and video picture signals to develop a composite video signal; and transmission means, comprising a transmission line, coupling said adder to said monitor receiver in closed circuit relationship, for applying said composite video signal to said monitor receiver to effect visual reproduction of the image carried by said image-bearing device.

6. In a closed circuit television transmission system comprising a first substantially unmodified conventional television receiver utilized as a scanner, an image-bearing device supported in predetermined relationship to the luminescent screen of said scanner receiver, and at least one additional television receiver utilized as a monitor, a transmitter unit comprising: synchronizing-signal take-off means, adapted to be coupled to said scanner receiver, for generating a synchronizing signal in response to a telecast received by said scanner receiver; photo-sensitive transducer means for generating a video picture signal modulated in accordance with light projected upon said image-bearing device from the luminescent screen of said scanner receiver; an adder, coupled to said synchronizing-signal take-off means and to said transducer means, for combining said synchronizing and video picture signals to develop a composite video signal; modulator means, coupled to said adder, for modulating said composite video signal with a carrier signal having a frequency within the standard television transmission frequency range; and a transmission line, coupling said modulator means in closed circuit relationship with said monitor receiver, for supplying said carrier-modulated composite video signal to said monitor receiver to effect visual reproduction of the image carried by said image-bearing device.

7. A transmitter unit for a television transmission system comprising a first substantially unmodified conventional television receiver utilized as a scanner and at least one additional television receiver utilized as a monitor, said transmitter unit comprising: a synchronizing signal generator for generating a synchronizing signal; means for developing a carrier-modulated synchronizing signal having synchronizing components corresponding to said synchronizing signal; means for applying said carrier-modulated synchronizing signal to said scanner receiver to control scanning of the picture tube in said scanner receiver; an image-bearing device supported in predetermined relationship to the luminescent screen of said scanner receiver to modulate the light output projected therefrom; photo-sensitive transducer means for generating a video picture signal modulated in accordance with light projected from the luminescent screen of said scanner receiver; an adding circuit, coupled to said synchronizing signal generator and to said transducer means, for combining said synchronizing and video picture signals to develop a composite video signal; and transmission means for transmitting said composite video signal to said monitor receiver to effect visual reproduction of the video information included therein.

8. A transmitter unit for a television transmission system comprising a first substantially unmodified conventional television receiver utilized as a scanner and at least one additional television receiver utilized as a monitor, said transmitter unit comprising: a synchronizing signal generator, including a horizontal-frequency oscillator and a vertical-frequency oscillator, for generating a synchronizing signal; photo-sensitive transducer means for generating a video picture signal modulated in accordance with light projected from the luminescent screen of said scanner receiver; an adding circuit, coupled to said synchronizing generator and to said transducer means, for combining said synchronizing and video picture signals to develop a composite video signal; a modulator, coupled to said adding circuit, for modulating said composite video signal with a carrier signal having a frequency within a standard television broadcast range to develop a carrier-modulated composite video signal; means for applying said carrier-modulated composite video signal to said scanner receiver to control scanning of the picture tube in said scanner receiver; and transmission means for transmitting said carrier-modulated composite video signal to said monitor receiver to effect visual reproduction of video information included therein.

9. A transmitter unit for a television transmission system comprising a first substantially unmodified conventional television receiver utilized as a scanner and at least one additional television receiver utilized as a monitor, said transmitter unit comprising: means for developing a carrier-modulated signal including vertical and horizontal sync components; synchronizing means for developing a synchronizing signal including vertical and horizontal sync components, said synchronizing means and said first-mentioned means being intercoupled to each other to maintain synchronism between the sync components of said two signals; means for utilizing said carrier-modulated signal in said scanner receiver to control scanning of the picture tube in said scanner receiver; photosensitive transducer means for generating a video picture signal modulated in accordance with light projected from the luminescent screen of said scanner receiver; an adding circuit, coupled to said synchronizing means and to said transducer means, for combining said synchronizing and video picture signals to develop a composite video signal; and transmission means for transmitting said composite video signal to said monitor receiver to effect visual reproduction of the video information included therein.

10. A transmitter unit for a television transmission system comprising a first substantially unmodified conventional television receiver utilized as a scanner and at least one additional television receiver utilized as a monitor, said transmitter unit comprising: means for developing a carrier-modulated signal including vertical and horizontal sync components; synchronizing means for developing a synchronizing signal including vertical and horizontal sync components, said synchronizing means and said first-mentioned means being intercoupled to each other to maintain synchronism between the sync components of said two signals; means for utilizing said carrier-modulated signal in said scanner receiver to control scanning of the picture tube in said scanner receiver; photosensitive transducer means for generating a video picture signal modulated in accordance with light projected from the luminescent screen of said scanner receiver; an adding circuit, coupled to said synchronizing means and to said transducer means, for combining said synchronizing and video picture signals to develop a composite video signal; modulator means, coupled to said adder, for modulating said composite video signal with a carrier signal having a frequency within a standard television transmission frequency range; and transmission means for transmitting said carrier-modulated composite video signal to said monitor receiver to effect visual reproduction of the video information included therein.

11. A transmitter unit for generating and transmitting a television signal for controlling a monitor television receiver of conventional type, said transmitter unit comprising: a substantially unmodified conventional television receiver including a cathode-ray picture tube and a deflection system for controlling scanning of said picture tube; synchronizing means for generating horizontal and vertical synchronizing signals; means for applying said synchronizing signals to said deflection system to control scanning of said picture tube and develop an unmodulated scanning raster thereon; an image-bearing device mounted in predetermined relationship to said picture tube to modulate the light output from said picture tube; photosensitive transducer means for generating a video picture signal modulated in accordance with light projected upon said image-bearing device from the luminescent screen of said picture tube; an adding circuit, coupled to said synchronizing means and to said transducer means, for combining said synchronizing and video picture signals to develop a composite video signal; means for modulating said composite video signal with a locally-generated carrier signal having a frequency substantially equal to a standard television carrier frequency to generate a carrier-modulated composite video signal; and transmission means for transmitting said carrier-modulated composite video signal to said monitor receiver to effect visual reproduction of the image carried by said image-bearing device.

12. A transmitter unit for generating a television signal for controlling a monitor television receiver of conventional type, said transmitter unit comprising: a substantially unmodified conventional television receiver including a cathode-ray picture tube and a deflection system for controlling scansion of the luminescent screen of said picture tube; synchronizing means for generating horizontal and vertical synchronizing signals; means for applying said synchronizing signal to said deflection system to control scansion of a substantially unmodulated luminous raster upon the luminescent screen of said picture tube; an image-bearing device comprising a transparency supported in juxtaposition to said picture tube screen for modulating the light output from said screen in accordance with a predetermined image; photosensitive transducer means, including a photocell positioned to intercept light from said picture tube after transmission through said image-bearing device, for generating a video picture signal modulated in accordance with image values of said image; an adding circuit, coupled to said synchronizing means and to said transducer means, for combining said synchronizing and video picture signals to develop a composite video signal; a modulator, coupled to said adding circuit, for modulating said composite video signal with a carrier signal having a frequency substantially equal to a standard television carrier frequency to develop a carrier-modulated composite video signal; and a transmission line, coupled to modulator and to said conventional television receiver, for transmitting said carrier-modulated composite video signal directly to said receiver to effect visual reproduction of said image at said receiver.

References Cited in the file of this patent

UNITED STATES PATENTS

| | | |
|---|---|---|
| 2,206,654 | Zworykin | July 2, 1940 |
| 2,248,985 | Gray | July 15, 1941 |
| 2,504,949 | Foufounis | Apr. 25, 1950 |
| 2,523,328 | Ranks | Sept. 26, 1950 |
| 2,537,173 | Szegho | Jan. 9, 1951 |
| 2,735,333 | Mitchell | Feb. 21, 1956 |
| 2,764,697 | Duke | Sept. 25, 1956 |